United States Patent
Haggai et al.

(10) Patent No.: US 7,606,259 B2
(45) Date of Patent: Oct. 20, 2009

(54) COMMUNICATION RESOURCE SCHEDULING AMONG MULTIPLE LINKS

(75) Inventors: Oren Haggai, Hillsboro, OR (US); Theodore Hetke, Hillsboro, OR (US); Ron Nevo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 635 days.

(21) Appl. No.: 11/106,464

(22) Filed: Apr. 15, 2005

(65) Prior Publication Data

US 2006/0233189 A1 Oct. 19, 2006

(51) Int. Cl.
H04L 12/42 (2006.01)
(52) U.S. Cl. ...................................... 370/449
(58) Field of Classification Search ............ 370/395.41, 370/437
See application file for complete search history.

(56) References Cited

U.S. PATENT DOCUMENTS

| | | | |
|---|---|---|---|
| 7,277,392 B2* | 10/2007 | Venteicher et al. | 370/237 |
| 7,286,505 B2* | 10/2007 | Trabelsi et al. | 370/329 |
| 7,411,926 B2* | 8/2008 | Batra et al. | 370/330 |
| 2003/0161292 A1* | 8/2003 | Silvester | 370/349 |
| 2005/0180356 A1* | 8/2005 | Gillies et al. | 370/329 |
| 2006/0159118 A1* | 7/2006 | Shvodian et al. | 370/449 |
| 2007/0140252 A1* | 6/2007 | Akhtar et al. | 370/395.2 |

OTHER PUBLICATIONS

G. Zussman, A. Segall, U. Yechiali, "Bluetooth Time Division Duplex—Analysis as a Polling System," Proc. $1^{st}$ IEEE Conf. on Sensors and Ad Hoc Communications and Networks (SECON '04), Oct. 2004.
R. Bhatia, A. Segall, G. Zussman, "Analysis of Bandwidth Allocation Algorithms for Bluetooth Wireless Personal Area Networks," Proc. WiOpt '04, Mar. 2004.
L. Har-Shai, R. Kofman, G. Zussman, A. Segall, "Inter-Piconet Scheduling in Bluetooth Scatternets," Proc. OPNETWORK 2002, Aug. 2002.
G. Zussman, U. Yechiali, A. Segall, "Exact Probabilistic Analysis of the Limited Scheduling Algorithm for Symmetrical Bluetooth Piconets," Proc. IFIP TC6 Personal Wireless Communications (PWC '03), LNCS vol. 2775 (eds.: M. Conti et al.), Springer, pp. 276-290, Sep. 2003.

* cited by examiner

*Primary Examiner*—Anh-Vu Ly
(74) *Attorney, Agent, or Firm*—Venable LLP; James R. Burdett; Kyle D. Petaja

(57) ABSTRACT

In situations in which a given communication device may be a slave node on multiple communication sub-networks, a communication resource of the communication device may be allocated so as to serve the various sub-networks according to a device-centric control protocol.

16 Claims, 2 Drawing Sheets

COMMUNICATION RESOURCE SCHEDULING AMONG MULTIPLE LINKS

BACKGROUND OF THE INVENTION

The advent of so-called ad hoc networks, including many personal-area networks (PANs), has led to the concept of a "scatter" type of operation. This refers to a situation in which a given node may simultaneously act as a slave node on one or more sub-networks, and possibly also as a master node on a sub-network. In other words, the node is simultaneously a participant on at least two sub-networks. Meanwhile, for example, to maintain low cost of devices, such a node may not have sufficient communications resources to simultaneously communicate on all of the links on which it is a node.

BRIEF DESCRIPTION OF THE DRAWINGS

Various embodiments of the invention will now be described in connection with the associated drawings, in which.

DETAILED DESCRIPTION OF EMBODIMENTS OF THE INVENTION

Figure 1:
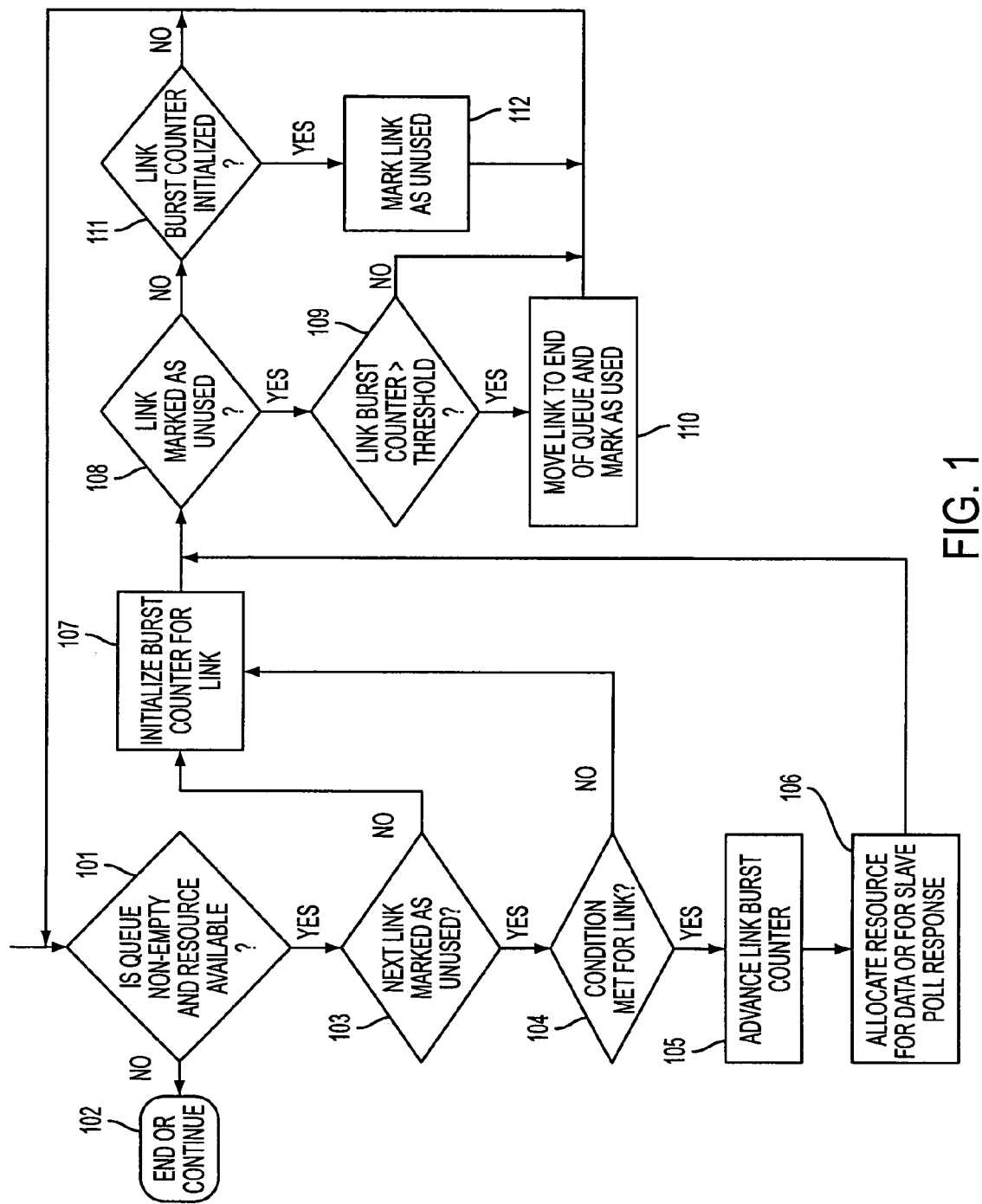
FIG. 1 depicts a flowchart of a method according to an exemplary embodiment of the invention.

In the following description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

According to some embodiments of the invention, an algorithm may be considered to be a self-consistent sequence of acts or operations leading to a desired result. These may include physical manipulations of physical quantities. Usually, though not necessarily, these quantities may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities, as applicable, and are merely convenient labels applied to these quantities.

According to some embodiments discussed below, terms such as "processing," "computing," "calculating," "determining," or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, in some embodiments, the term "processor" may refer to any device or portion of a device that processes electronic data from registers and/or memory to transform that electronic data into other electronic data that may be stored in registers and/or memory. A "computing platform" may, in some embodiments, comprise one or more processors.

Some embodiments of the present invention may include apparatuses for performing the operations herein. An apparatus may be specially constructed for the desired purposes, or it may comprise a general purpose device selectively activated or reconfigured by a program stored in the device.

Some embodiments of the invention may be implemented in one or a combination of hardware, firmware, and software. Embodiments of the invention may also be implemented as instructions stored on a machine-accessible medium, which may be read and executed by a computing platform to perform the operations described herein. A machine-accessible medium may include any mechanism for storing or transmitting information in a form readable by a machine (e.g., a computer). For example, a machine-accessible medium may include read only memory (ROM); random access memory (RAM); magnetic disk storage media; optical storage media; flash memory devices; and others.

FIG. 1 shows a flowchart of a method according to an embodiment of the invention. According to embodiments of the invention, a particular device in a network may include a queue that may be used to keep track of all of its sub-network slave connections. FIG. 1 describes an exemplary method by which such a queue may be used to track the different connections (or links) and to allocate them to a given communication resource.

The exemplary process of FIG. 1 may begin with block 101, where the process may test if the queue is occupied and if there is an available communication resource. If not, the process may either end or, alternatively, may continue 102 by returning to block 101. If the queue is occupied and there is an available resource, the process may continue to block 103, where it may determine if the link in the queue is marked as unused. If the link is marked as unused, the process may continue to block 104. If not, the process may proceed to block 107 (to be discussed below).

Block 104 may determine if one of a number of conditions are met for the link under consideration. Such conditions may be chosen so that the communication resource may be allocated to a link for which a remote master device is expecting the slave device to be listening or for which the slave device is expecting a remote master device to poll the slave device. These conditions may reflect states in which the link requires the communication resource to send and/or receive a data burst. Three such conditions may be as follows:

On this link, the device is awaiting a polling message from a remote master device. Whether or not this is true may be determined by calculating a fraction of a polling interval for the link. This may serve as an estimate for a start of a data burst by the remote master device.

On this link, a remote master device has already begun a data burst. That is, if the master device has begun transmitting on the link, the present slave device may continue to listen. In some embodiments, the fact that one data packet has been transmitted may indicate that additional data packets will follow.

On this link, the device is awaiting an acknowledgment (ACK) message for a previously-transmitted message on this link.

If any of these conditions is met, the process may continue with block 105. If not, then the process may proceed to block 107.

In some embodiments of the invention, a burst counter may be established for each link in the queue. Such a burst counter may be used to keep track of usage of the communication resource by a given link, and it may be particularly useful in tracking contiguous time allocations to that link (e.g., time allocations that may correspond to data burst times). In some embodiments, the count kept by the burst counter may be compared with a threshold value to cap usage by a single link; this will be discussed further below. In block 105, however, the burst counter for the link being considered may be advanced. The process may then continue with block 106. On the other hand, if the process proceeded to block 107, the burst counter for the link may be initialized (i.e., established and/or set to zero), and the process may then proceed to block 108, which will be discussed below.

Block 106 may perform allocation of the communication resource to the link being considered. In so doing, the process may test to determine if there is data present for transmission. However, even if there is no data, there may still be a need to allocate the communication resource to the link, particularly if, in the role of a slave node, the device may be expected to listen for a remote master's polling or to receive data. Following block 106, the process may proceed to block 108.

Block 108 may determine if the link is marked as unused. If so, then the process may proceed to block 109. If not, then the process may proceed to block 111.

In block 109, the link burst counter may be compared to a threshold. This threshold may represent a maximum burst length for a link and may be used to prevent monopolization of a communication resource by a particular link. This threshold may be set empirically and may depend upon network design. If block 109 determines that the link burst counter is greater than the threshold, the process proceeds to block 110, where the link may be moved to the end of the queue and may be marked as used. Following block 110, the process may loop back to block 101. If block 109 determines that the link burst counter is not greater than the threshold, the process may simply loop back to block 101.

Block 111 may test if the link burst counter has been initialized. If it is determined that the link burst counter has been initialized, the link may be marked as unused 112, and the process may loop back to block 101. Otherwise, the process may simply loop back to block 101, without executing block 112.

Figure 2:
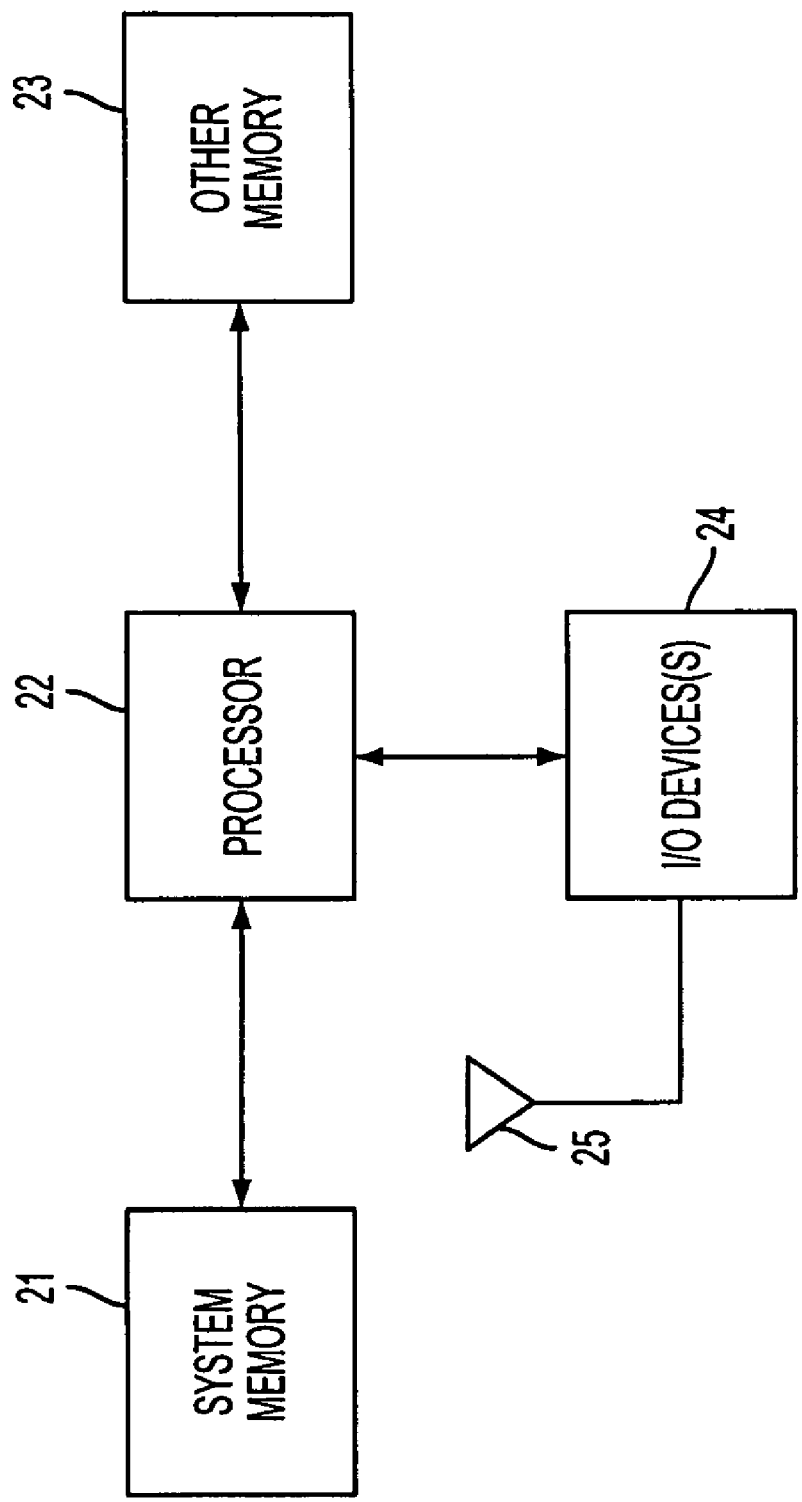
FIG. 2 depicts a conceptual block diagram of a system that may be used to implement an exemplary embodiment of the invention.

Some embodiments of the invention, as discussed above, may be embodied in the form of software instructions on a machine-accessible medium. Such an embodiment may be illustrated in FIG. 2. The computer system of FIG. 2 may include at least one processor 22, with associated system memory 21, which may store, for example, operating system software and the like. The system may further include additional memory 23, which may, for example, include software instructions to perform various applications. System memory 21 and additional memory 23 may comprise separate memory devices, a single shared memory device, or a combination of separate and shared memory devices. The system may also include one or more input/output (I/O) devices 24, for example (but not limited to), keyboard, mouse, trackball, printer, display, network connection, etc. The present invention may be embodied as software instructions that may be stored in system memory 21 or in additional memory 23. Such software instructions may also be stored in removable or remote media (for example, but not limited to, compact disks, floppy disks, etc.), which may be read through an I/O device 24 (for example, but not limited to, a floppy disk drive). Furthermore, the software instructions may also be transmitted to the computer system via an I/O device 24, for example, a network connection. Furthermore, I/O devices 24 may include one or more wireless communication devices, which may be coupled to an antenna 25. Antenna 25 may include, for example, but is not limited to, one or more of the following: a unipole antenna, a dipole antenna, an omnidirectional antenna, a strip-type antenna, and a phased-array antenna.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method comprising:

providing a queue of communication links, by a processor, on which a device is slave node; and allocating a communication resource of said device to a link to be selected from said queue, said link to be selected such that a condition selected from the following group is met:

(a) a remote master device expects said device to be listening on said link; and (b) said device expects to be polled by a remote master device on said link;

wherein said condition that a remote master device expects said device to be listening on said link comprises at least one of the following sub-conditions:

(a1) said remote master device has already begun a data burst on said link; or (a2) said device is awaiting an acknowledgment message for a previously-transmitted message on said link.

2. The method according to claim 1, further comprising:

providing a burst counter for each link in said queue; and wherein said allocating includes:

incrementing said burst counter for said link in an amount equal to a number of data bursts for which said communication resource is allocated to said link.

3. The method according to claim 2, said allocating further comprising:

comparing said burst counter for said link to a predetermined threshold, wherein said link is moved to a back end of said queue if said burst counter for said link exceeds said predetermined threshold.

4. The method according to claim 2, wherein each said burst counter is to track a number of contiguous data burst times allocated to said particular link.

5. A computer-readable medium that provides computer executable instructions, which when executed by a computing platform, cause said computing platform to perform operations comprising:

providing a queue of communication links on which a device including said computing platform is a slave node; and allocating a communication resource of said device to a link to be selected from said queue, said link to be selected such that a condition selected from the following group is met:

(a) a remote master device expects said device to be listening on said link; and (b) said device expects to be polled by a remote master device on said link;

wherein said condition that a remote master device expects said device to be listening on said link comprises at least one of the following sub-conditions:

(a1) said remote master device has already begun a data burst on said link; or (a2) said device is awaiting an acknowledgment message for a previously-transmitted message on said link.

6. The computer-readable medium according to claim 5, further containing instructions that, when executed by said computing platform, cause said computing platform to perform the further operation of:

providing a burst counter for each link in said queue; and wherein said allocating includes:

incrementing said burst counter for said link in an amount equal to a number of data bursts for which said communication resource is allocated to said link.

7. The computer-readable medium according to claim 6, said allocating further comprising:

comparing said burst counter for said link to a predetermined threshold, wherein said link is moved to a back end of said queue if said burst counter for said link exceeds said predetermined threshold.

8. The computer-readable medium according to claim 6, wherein each said burst counter is to track a number of contiguous data burst times allocated to said particular link.

9. An apparatus comprising:

means for providing a queue of communication links on which said apparatus is a slave node; and means for allocating a communication resource of said apparatus to a link to be selected from said queue, said link to be selected such that a condition selected from the following group is met:

(a) a remote master device expects said apparatus to be listening on said link; and (b) said apparatus expects to be polled by a remote master device on said link;

wherein said condition that a remote master device expects said apparatus to be listening on said link comprises at least one of the following sub-conditions:

(a1) said remote master device has already begun a data burst on said link; or (a2) said apparatus is awaiting an acknowledgment message for a previously-transmitted message on said link.

10. The apparatus according to claim 9, further comprising:

means for providing a burst counter for each link in said queue; and wherein said means for allocating further comprises:

means for incrementing said burst counter for said link in an amount equal to a number of data bursts for which said communication resource is allocated to said link.

11. The apparatus according to claim 10, said means for allocating further comprises:

means for comparing said burst counter for said link to a predetermined threshold, wherein said link is moved to a back end of said queue if said burst counter for said link exceeds said predetermined threshold.

12. The apparatus according to claim 10, wherein each said burst counter is to track a number of contiguous data burst times allocated to said particular link.

13. A system comprising:

a queue of communication links on which said system is a slave node; and a communication device of said system allocated to a link to be selected from said queue, said link to be selected such that a condition selected from the following group is met:

(a) a remote master device expects said system to be listening on said link; and (b) said system expects to be polled by a remote master device on said link;

wherein said condition that a remote master device expects said system to be listening on said link comprises at least one of the following sub-conditions:

(a1) said remote master device has already begun a data burst on said link; or (a2) said system is awaiting an acknowledgment message for a previously-transmitted message on said link.

14. The system according to claim 13, further comprising:

a burst counter for each link in said queue; and wherein said burst counter is incremented for said link in an amount equal to a number of data bursts for which said communication device is allocated to said link.

15. The system of claim 13, wherein the system further comprises:

at least one antenna coupled to said communication device.

16. The system according to claim 15, said antenna comprising at least one antenna selected from the group consisting of: a unipole antenna, a dipole antenna, an omnidirectional antenna, a strip-type antenna, and a phased-array antenna.

* * * * *

UNITED STATES PATENT AND TRADEMARK OFFICE
CERTIFICATE OF CORRECTION

PATENT NO. : 7,606,259 B2 Page 1 of 1
APPLICATION NO. : 11/106464
DATED : October 20, 2009
INVENTOR(S) : Haggai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Fourteenth Day of December, 2010

David J. Kappos
*Director of the United States Patent and Trademark Office*